(12) United States Patent
Malekpour

(10) Patent No.: US 7,770,908 B1
(45) Date of Patent: Aug. 10, 2010

(54) HUMAN-POWERED ENGINE

(76) Inventor: Rouzbeh R. Malekpour, 1800 Prosser Ave., #7, Los Angeles, CA (US) 90025

( * ) Notice: Subject to any disclaimer, the term of this patent is extended or adjusted under 35 U.S.C. 154(b) by 114 days.

(21) Appl. No.: 11/986,732

(22) Filed: Nov. 27, 2007

Related U.S. Application Data

(60) Provisional application No. 60/960,596, filed on Oct. 4, 2007.

(51) Int. Cl.
*B62M 1/18* (2006.01)
(52) U.S. Cl. ............... 280/221; 280/226.1; 280/223
(58) Field of Classification Search ............ 280/226.1
See application file for complete search history.

(56) References Cited

U.S. PATENT DOCUMENTS

| 3,979,135 A | * | 9/1976 | Meritzis | 280/226.1 |
| 5,544,906 A | * | 8/1996 | Clapper | 280/288.1 |
| 5,732,963 A | * | 3/1998 | White | 280/221 |

\* cited by examiner

*Primary Examiner*—Lesley Morris
*Assistant Examiner*—Jacob Knutson
(74) *Attorney, Agent, or Firm*—Robert M. Sperry, Esq.

(57) ABSTRACT

An improved human-powered engine which is actuated by forward and rearward movement of the body to cause extension of a resilient member which serves to provide driving motion to a wheel, propeller or the like.

7 Claims, 1 Drawing Sheet

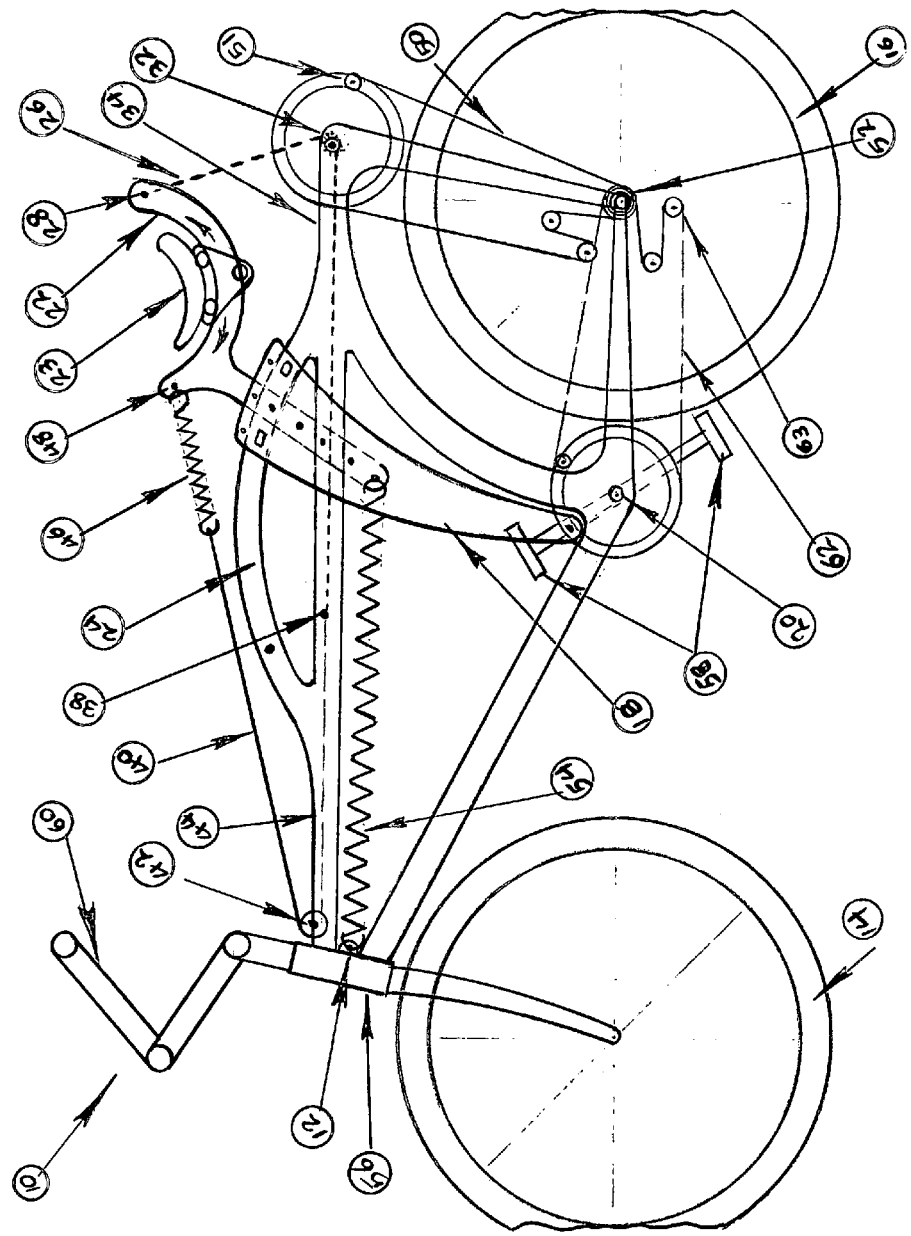

HUMAN-POWERED ENGINE

RELATED CASES

This invention is described in my Provisional Application, Ser. No. 60/960,596, filed Oct. 4, 2007, and now Nov. 20, 2007.

FIELD OF INVENTION

This invention relates to vehicles and is particularly directed to improved human-powered engines for propelling vehicles.

PRIOR ART

Humans have long powered vehicles, such as boats, bicycles and the like by using oars, pedals and the like. However, all of the prior art human powered vehicles have required considerable effort on the part of the human to accomplish significant speed or power. Moreover, all of the prior art human-powered vehicles have been operable only by persons in good physical condition and having few, if any, handicaps. Thus, rowing requires strong arms and legs for pulling the oars, while bicycling requires strong legs for pushing the pedals. Thus, persons with physical limitations are severely limited in their ability to use such devices and none of the prior art human-powered devices have been entirely satisfactory.

BRIEF SUMMARY AND OBJECTS OF INVENTION

These disadvantages of the prior art are overcome with the present invention and an improved human-powered engine is provided which is simple and easy to use, even for people with physical handicaps, yet which can serve to propel virtually any type of vehicle, such as cars, bicycles, boats or airplanes.

These advantages of the present invention are preferably attained by providing an improved human engine which is actuated by forward and rearward movement of the body to cause extension of a resilient member which serves to provide driving motion to a wheel, propeller or the like.

Accordingly, it is an object of the present invention to provide an improved human-powered engine.

Another object of the present invention is to provide an improved human-powered engine for propelling a vehicle.

A further object of the present invention is to provide an improved human-powered engine for propelling a vehicle which is simple and easy to use.

An additional object of the present invention is to provide an improved human-powered engine for propelling a vehicle which is simple and easy to use, even for people with physical handicaps.

A specific object of the present invention is to provide an improved human-powered engine which is actuated by forward and rearward movement of the body to cause extension of a resilient member which serves to provide driving motion to a wheel, propeller or the like.

These and other objects and features of the present invention will be apparent from the following detailed description, taken with reference to the figures of the accompanying drawing.

BRIEF DESCRIPTION OF THE DRAWING

FIG. 1 is a side view of a bicycle embodying the human-powered engine of the present invention.

DETAILED DESCRIPTION OF THE INVENTION

In that form of the present invention chosen for purposes of illustration, FIG. 1 show a bicycle, indicated generally at 10, having a frame 12 supported by wheels 14 and 16, with a pivot bar 18 pivotally mounted adjacent the peddle sprocket 20 and supporting a seat support 22 for forward and rearward movement along an arcuate track 24. A seat 23 is slideably mounted on the seat support 22 to always maintain the rider in a proper position. A bicycle chain 26 has one end 28 connected to the back 30 of the seat 22 support and extends about a sprocket 32 mounted on the rear end 34 of the upper member 36 of the bicycle frame 12. The forward end 38 of bicycle chain 26 is connected to a cable 40 which extends about a pully wheel 42, mounted adjacent the front end 44 of the upper frame member 36, and is connected, by a suitable tensioning member 46, to the front 48 of the seat support 22. The tensioning member 46 may a spring, a turnbuckle, or the like which serves to maintain a constant tension on the bicycle chain 26. The sprocket 32 rotates freely, when rotated in a clockwise direction, but, when rotated counterclockwise, the sprocket 32 serves to drive bicycle chain 50 which, in turn, acts through a first derailer 51 and rear sprocket 52 to drive the rear wheel 16 of the bicycle 10. Finally, a spring 54 is connected between the pivot bar 18 and the front member 56 of the bicycle frame 12.

In use, the rider drives the seat support 22 rearward, by pushing with his legs against the peddles 58 or by pushing with his arms against the handlebars 60 or both. The rearward movement of the seat support 22 carries the pivot bar 18 rearward, which serves to expand the spring 54. When the seat support 22 reaches its rearmost position, the rider ceases pushing, whereupon the spring 54 serves to pull the pivot bar 18 and seat support 22 forward. This causes bicycle chain 26 to rotate sprocket 32 counterclockwise, which drives chain 50, sprocket 52 and rear wheel 16 to propel the bicycle 10. As is well known in multi-speed bicycles, the sprockets 32 and 52 may contain gearing so that a single movement of the seat support 22 may result in many rotations of the wheel 16. If desired, a bicycle chain 62 may connect the peddle sprocket 20 with sprocket 52 through derailer 63 to provide additional driving power for the rear wheel 16.

It will be apparent that the human engine described above could also be used to power an automobile-type vehicle. Alternatively, the bicycle chain 50 could be connected to drive a propeller for propelling a boat or airplane. In addition, numerous variations and modifications can obviously be made without departing from the spirit of the present invention. Therefore, it should be clearly understood that the forms of the present invention described above and shown in the figures of the accompanying drawing are illustrative only and are not intended to limit the scope of the present invention.

What is claimed is:

1. A human powered engine comprising:

a track, a seat mounted for forward and rearward movement along said track, a peddle sprocket driving a first chain for driving a vehicle, a lever carried by said seat and having one end of said lever pivotally mounted adjacent said peddle sprocket, a spring expandable by rearward movement of said seat and connected to said lever, a second sprocket freely rotatable in a first direction and drivingly rotatable in a second direction, a second bicycle chain having one end connected to the back of said seat and extending about said second sprocket to a connection with a cable connecting said second chain to the front of said seat, said second chain serving to rotate said second sprocket in said first direction when said seat is moved rearwardly and to rotate said second sprocket in said second direction when said seat is moved forwardly, and means carried by said second sprocket for driving a vehicle when said sprocket is rotated in said second direction.

2. The engine of claim 1 further comprising:

tensioning means connected between the front of said seat and said cable to maintain constant tension on said bicycle chain.

3. The engine of claim 1 wherein:

contraction of said spring serves to move said seat forward.

4. The engine of claim 1 wherein:

said track is arcuate.

5. The engine of claim 1 wherein:

said peddle sprocket drives the first chain connectable to actuate drive means for said vehicle.

6. The engine of claim 5 wherein:

said drive means is a wheel.

7. The engine of claim 5 wherein:

said drive means is a propeller.

\* \* \* \* \*